US012775288B2

(12) United States Patent
Schulz et al.

(10) Patent No.: US 12,775,288 B2
(45) Date of Patent: Oct. 27, 2026

(54) LOCATION-BASED OPERATING OF DEVICES IN AN INDUSTRIAL PLANT

(71) Applicant: ABB Schweiz AG, Baden (CH)

(72) Inventors: Dirk Schulz, Meckenheim (DE); Thomas Gamer, Brühl (DE); Philipp Bauer, Weinheim (DE); Francisco Mendoza, Laudenbach (DE)

(73) Assignee: ABB Schweiz AG, Baden (CH)

( * ) Notice: Subject to any disclaimer, the term of this patent is extended or adjusted under 35 U.S.C. 154(b) by 35 days.

(21) Appl. No.: 18/836,067

(22) PCT Filed: Feb. 7, 2022

(86) PCT No.: PCT/EP2022/052882

§ 371 (c)(1),
(2) Date: Aug. 6, 2024

(87) PCT Pub. No.: WO2023/147883

PCT Pub. Date: Aug. 10, 2023

(65) Prior Publication Data

US 2025/0155900 A1 May 15, 2025

(51) Int. Cl.
*G05D 1/693* (2024.01)
*G05D 1/698* (2024.01)
*G05D 107/70* (2024.01)

(52) U.S. Cl.
CPC ........... *G05D 1/693* (2024.01); *G05D 1/6987* (2024.01); *G05D 2107/70* (2024.01)

(58) Field of Classification Search
CPC .. G05D 1/693; G05D 1/6987; G05D 2107/70; G05B 2219/49143; G05B 2219/49157; G05B 19/4061; B25J 9/1666
See application file for complete search history.

(56) References Cited

U.S. PATENT DOCUMENTS 7,603,235 B2 10/2009 Mäkeläet al.
9,566,908 B2 2/2017 Croteau et al.
(Continued)

FOREIGN PATENT DOCUMENTS

EP 2631729 B1 6/2016
WO WO 2016/128066 A1 8/2016
WO 2020016128 A1 1/2020

OTHER PUBLICATIONS

Li et al.; An Effective and Secure Key Management Protocol for Message Delivery in Autonomous Vehicular Clouds; Sensors 2018, 18, 2896; doi:10.3390/s18092896; www.mdpi.com/journal/sensors (Year: 2018).*

(Continued)

*Primary Examiner* — Helal A Algahaim
(74) *Attorney, Agent, or Firm* — Fitch Even Tabin & Flannery LLP

(57) ABSTRACT

A computer-implemented method (100) for operating a plurality of devices (21-25) in an industrial plant (1), comprising the steps of: —obtaining (110) at least the location (21*a*) of a to-be-controlled device (21) within the industrial plant (1); —obtaining (120) at least the locations (22*a*-25*a*) of other devices (22-25) in the vicinity of the to-be-controlled device (21); —determining (130), based at least in part on a ruleset (3) with rules that are dependent at least on the locations (22*a*-25*a*) of the other devices (22-25), at least one action (4) that may be performed by the to-be-controlled device (21); and —causing (140) the to-be-controlled device (21) to perform the at least one action (4).

12 Claims, 3 Drawing Sheets

(56) References Cited

U.S. PATENT DOCUMENTS

| | | | |
|---|---|---|---|
| 10,233,753 B2 | 3/2019 | Hanski et al. | |
| 2002/0143461 A1* | 10/2002 | Burns | G05D 1/0297 701/23 |
| 2012/0046818 A1* | 2/2012 | Nettleton | E21F 17/00 700/95 |
| 2017/0144307 A1* | 5/2017 | Rublee | B25J 19/02 |
| 2017/0195826 A1 | 7/2017 | Shaikh et al. | |
| 2018/0151070 A1* | 5/2018 | Katou | H04W 4/44 |
| 2018/0178382 A1 | 6/2018 | Lalonde et al. | |
| 2018/0324546 A1 | 11/2018 | Jones | |
| 2019/0205115 A1 | 7/2019 | Gomes | |
| 2021/0092604 A1 | 3/2021 | Fox et al. | |

OTHER PUBLICATIONS

Chattopadhyay et al.; Autonomous Vehicle: Security by Design; IEEE Transactions On Intelligent Transportation Systems, vol. 22, No. 11, Nov. 2021 (Year: 2021).*

Madl, T.; Security Concept with Distributed Trust-Levels for Autonomous Cooperative Vehicle Networks; 2021 IEEE Intelligent Vehicles Symposium (IV) Jul. 11-17, 2021. Nagoya, Japan (Year: 2021).*

Android Developers, “Create and monitor geofences,” downloaded from the Internet on Jul. 31, 2024, at https://developer.android.com/develop/sensors-and-location/location/geofencing, 13 pp. (Jul. 29, 2024).

Aucotec, “Automated calculation of intrinsic safety: Standard-compliant intrinsic safety (“Ex-i”), with Engineering Base reduces work and errors,” webpage downloaded from the Internet on Jul. 31, 2024, at https://www.aucotec.com/en/plant-solutions/feed-process/automated-calculation-of-intrinsic-safety/, 3 pp. (Jul. 2024).

Butler et al., “The GeoJSON Format,” Standards Track, *Internet Engineering Task Force*, 28 pp. (Aug. 2016).

Chen et al., “Advances of SBAS authentication technologies,” *Satellite Navigation*, 2(12): 7 pp. (Jun. 28, 2021).

Microsoft, “Facility Ontology,” article downloaded from the Internet on Jul. 31, 2024, at https://learn.microsoft.com/en-us/azure/azure-maps/creator-facility-ontology?tabs=dwg&pivots=facility-ontology-v1, 16 pp. (Apr. 14, 2023).

Microsoft, “Geofencing GeoJSON data,” article downloaded from the Internet on Jul. 31, 2024, at https://learn.microsoft.com/en-us/azure/azure-maps/geofence-geojson, 3 pp. (Apr. 14, 2023).

Petovello, “What is navigation message authentication?,” GNSS Solutions, *Inside GNSS*, 26-31 (Jan.-Feb. 2018).

Wikipedia, “Geofence,” webpage downloaded from the Internet on Jul. 31, 2024, at https://en.wikipedia.org/wiki/Geofence, 7 pp. (Jul. 29, 2024).

European Patent Office, International Search Report in International Patent Application No. PCT/EP2022/052882, 5 pp. (Sep. 16, 2022).

European Patent Office, Written Opinion in International Patent Application No. PCT/EP2022/052882, 7 pp. (Sep. 16, 2022).

European Patent Office, Extended European Search Report in European Patent Application No. 21173055.1, 13 pp. (Oct. 25, 2021).

European Patent Office, International Search Report in International Patent Application No. PCT/EP2022/061033, 3 pp. (Jul. 20, 2022).

European Patent Office, Written Opinion in International Patent Application No. PCT/EP2022/061033, 11 pp. (Jul. 20, 2022).

U.S. Appl. No. 18/506,258, filed Nov. 10, 2023.

Office Action issued in corresponding Chilean Application No. 202402340; dated Mar. 18, 2026; In Spanish with English translation PDF.

* cited by examiner

LOCATION-BASED OPERATING OF DEVICES IN AN INDUSTRIAL PLANT

FIELD OF THE INVENTION

The invention relates to the coordinating of operations of multiple movable pieces of equipment in an industrial plant, such as machinery in a mining plant.

BACKGROUND

In complex industrial plants, such as mining plants, operation of many movable pieces of machinery has to be coordinated. Examples of such machinery include trucks, earth-moving equipment such as front-loaders or excavators, and drones that are used to survey the plant. The primary goal of the coordination is to avoid collisions between different pieces of machinery. In a related field of technology, namely pick-and-place manufacturing in a factory by robots, WO 2016/128 066 A1 discloses a method for avoiding collisions between two robots that reside at fixed positions side by side, but have arms with overlapping work areas.

In a simple setting where every piece of movable equipment is individually responsible for avoiding collisions with other equipment, the collision avoidance drastically reduces the speed with which the equipment may move. If equipment has to move across large distances within the plant, this costs much time. The better a coordination between different pieces of equipment, the higher moving speeds may be allowed.

OBJECTIVE OF THE INVENTION

It is therefore the objective of the present invention to improve the coordination between movable devices in an industrial plant, such that they may be operated at higher moving speeds without sacrificing safety.

This objective is achieved by a method according to the independent claim. Further advantageous embodiments are detailed in the dependent claims.

BRIEF DESCRIPTION OF THE FIGURES

In the following, the invention is illustrated using Figures without any intention to limit the scope of the invention. The Figures show.

DISCLOSURE OF THE INVENTION

Figure 1:
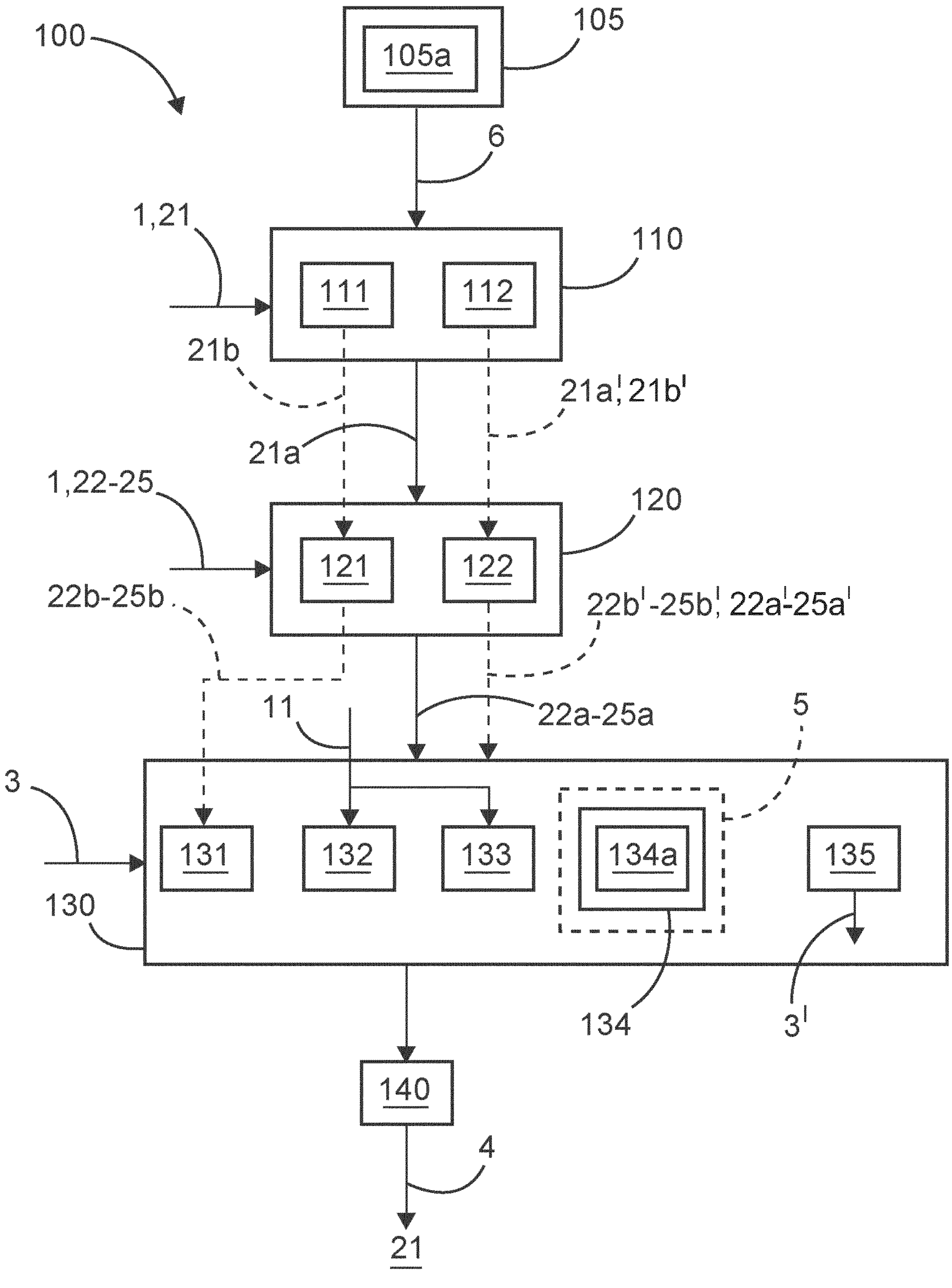
FIG. 1: Exemplary embodiment of the method 100 for operating a plurality of devices 21-25 in an industrial plant 1.

The invention provides a computer-implemented method for operating a plurality of devices in an industrial plant. In the course of this method, at least the location of a to-be-controlled device within the industrial plant is obtained. This location may be given at any desired level of granularity. For example, the location may be given as a precise position, or in the form of an area of a zone within which the to-be-controlled device currently is. Optionally, further information about the to-be-controlled device, such as intended operations of this device, may be considered as well.

At least the locations of other devices in the vicinity of the to-be-controlled device are obtained. Again, these locations may be given at any desired level of granularity. Moreover, they may be given in absolute coordinates or relative to the location of the to-be-controlled device, depending on what is most convenient for the application at hand. Conversion between absolute and relative locations is standard-issue.

Based at least in part on a ruleset with rules that are dependent at least on the locations of the other devices, at least one action that may be performed by the to-be-controlled device is determined. In particular, the rules may consider the relative locations of the other devices with respect to the location of the to-be-controlled device. The to-be-controlled device is then caused to perform the at least one action.

The rules in the ruleset may, for example, stipulate that collisions between the devices are to be avoided. If central coordination between multiple devices guarantees that there will be no collision, there is no more need for the devices to move slower in order to avoid collisions. Rather, the devices may move on their planned trajectories at maximum speed. This is in some way analogous to the handling of air traffic. It would be impossible to conduct air traffic in its present volume if every pilot had to handle the avoiding of collisions on his own. At typical cruising speeds, it would be impossible to track so many other planes and react in time. To fly at these speeds, pilots need guarantees from air traffic control that the airspace they are proceeding into is free and no other airplane is supposed to intersect their planned trajectory.

But the rules in the ruleset are not limited to avoiding collisions. Rather, they may consider any potential interaction between multiple devices that may be disadvantageous for the operation of each of these devices, or for the operation of the plant as a whole.

For example, if a first device is to perform a measurement that is sensitive to vibrations, it is to be avoided that another device in the vicinity couples vibrations into the first device or its working area. Other devices in the vicinity then have to keep a sufficient distance from the first device, and/or adapt their intended operations such that they produce less vibrations.

In another example, if a first device is to receive radio communications on a particular frequency, it is to be avoided that another device in the vicinity transmits at high power on the same or very similar frequency, shouting down what the first device is trying to receive. Other devices may then be compelled to keep their distance, direct their radio transmissions away from the first device, change the frequency of their transmissions, and/or reduce their transmit power.

All such interactions can be considered in one single common framework. In this manner, any information about the to-be-controlled device, and/or about the other devices, needs to be acquired only once and can then be re-used as many times as needed in many rules.

One particular advantage of improving the coordination between the activities of multiple devices in the described manner is that the triggering of primary safety systems in the devices may be avoided. For example, even if a vehicle or other movable device is equipped with some emergency stop that will trigger before this device collides with another device, it is a very disadvantageous situation if such a primary safety system is triggered. The device, or even the complete industrial process in which the device is participating, may be brought to a standstill. Also, the triggering of some primary safety systems may cause equipment damage. The systems may be deliberately devised such that in case of need, a minor equipment damage is accepted for the sake of avoiding a far larger calamity. But the damage is not acceptable if the primary safety system is triggered unnecessarily.

In a particularly advantageous embodiment, a mutual cryptographic trust relationship is established among the devices in the industrial plant, and between these devices and an entity that causes the to-be-controlled device to perform the at least one action. For example, this entity may be a central control entity. The cryptographic trust relationship provides a guarantee that if the to-be-controlled device has been instructed to perform the at least one action, this means that the action has been validated against the ruleset by the entity that is competent for this task. For example, if the action is to move the to-be-controlled device to a particular position, this may be done with the maximum available speed without setting aside a safety margin for collision avoidance.

For example, the establishing of the mutual cryptographic trust relationship may comprise onboarding the devices and the entity onto a common public-key infrastructure, PKI. The device, respectively the entity, then only needs to prove possession of a private key whose corresponding public key has been signed by a certification authority of the PKI.

In a particularly advantageous embodiment, a space occupied by the to-be-controlled device is obtained. Furthermore, spaces occupied by the other devices in the vicinity of the to-be-controlled devices are obtained. At least one rule of the ruleset stipulates that the space occupied by the to-be-controlled device must not intersect a space occupied by another device in the vicinity of the to-be-controlled device.

In this manner, the avoiding of collisions may be refined to account for devices having different sizes and considering the specific shapes. For example, in a mining plant, a bucket-wheel excavator occupies much more space than a front-loader. Available space in the industrial plant can then be used more efficiently. Occupied space may optionally include space in which a part of the device may move, and/or a space which has to be kept clear for safety while the device is working. For example, the beam of a bucket-wheel excavator may have a "bounding box" with an arbitrarily complex three-dimensional shape around it that is off-limits to other devices because other devices in this "bounding box" might be hit by the beam, by the bucket-wheel, and/or by freshly excavated material, and this bounding box has dynamic position and orientation, i.e. it typically will change position with the movement/operation of the excavator. More complex three-dimensional shapes are conceivable. In conclusion, there are many cases in industrial environments where a simple position or a two-dimensional area of a device is not sufficient to control behavior.

In a further advantageous embodiment, a predicted and/or planned future location of the to-be-controlled device, respectively a predicted and/or planned future space occupied by the to-be-controlled device, is obtained. Also, a predicted and/or planned future location of at least one other device in the vicinity of the to-be-controlled device, respectively a predicted and/or planned future space occupied by this other device, is obtained. In this manner, the collision avoidance may be refined further. In particular, a guarantee that a particular space will be free for entry by the to-be-controlled device, and/or by another device in the vicinity, may be made even more reliable.

As discussed before, in a particularly advantageous embodiment, at least one to-be-controlled device and at least one other device in the vicinity of the to-be-controlled device are work vehicles configured for operating in a mining plant or on a construction site. In such plants and sites, movable devices frequently have to cover large distances, so the benefit of being able to move faster because of a better coordination between devices is most pronounced.

In a further particularly advantageous embodiment, the ruleset further comprises at least one rule that is dependent on whether the location of the to-be-controlled device is within a predetermined zone in the industrial plant. Such zones may thus be regarded as "geofences" that regulate which activities may be performed where in the industrial plant. Unlike "geofences", which optionally allow using height information for a fence, such zones may represent also complex three-dimensional spaces.

Thus, the behavior of devices, equipment or mobile workflows may be easily reconfigured based on the zone that a device in which it is located, and/or the zone that the device is entering or leaving. Herein, the entering of a zone may include a case where equipment is switched on within a zone. The reconfiguration may range from the basic customization of device parameters to policy-compliant movement of vehicles.

Examples for zones include:

restricted areas or airspace;

zones with potentially explosive atmosphere; and service zones or operating zones for particular equipment.

In a particularly advantageous embodiment, the predetermined zones are defined independently from the ruleset and referenced directly or by type/class of zone from the at least one rule in the ruleset. That is, the zones may be defined once and then used in multiple rules of the ruleset, and even re-used for multiple devices of different types. No duplicate work for defining zones is required if a new type of equipment is introduced into the plant.

Thus, building an open and secure industrial geofencing system that runs zone management, localization and location-based services as decoupled functions but integrated over a common secure system infrastructure of a plant or production site allows defining zones and policies/intents using global workflows, sharing them openly in the system, and authenticating them in the location-based service before use.

This improved location intelligence provides deeper insight into the physical state of the system and actionable data to configure industrial devices or sub-systems zone-specific capabilities (e.g., access confidential data, move with higher speed) or limitations (e.g., reduced energy consumption, switching to a safe state) in a systematic and reliable way.

An automation system may thus be equipped with functions for managing zone description data, functions for localizing equipment, and Functions, communicatively coupled with the previous two over a network, to monitor the location and location change of equipment relative to the zones, triggering a predefined activity for entering, leaving, or moving within a zone.

Herein, zones may be annotated with semantic tags indicating relevant properties or characteristics within the system context, and zone and location data are signed from a common root of trust (e.g. signatures using RSA or ECC) to allow the monitoring function to authenticate data), allowing the automation system and its components or subsystems, respectively, to self-adjust their behavior depending on equipment location/movement without themselves having to contain zone management or localization functions.

Thus, there is a particular synergy between the use of zones in rules, and in particular the use of zones that are defined independently from the ruleset and referenced from at least one rule in the ruleset, on the one hand, and the establishing of a mutual cryptographic trust relationship on the other hand.

In particular,

- during system setup, zone management and localization systems may receive private keys derived from a common root of trust; and the location based services, LBS, may receive public keys;
- zones may be defined;
- zones may be annotated with properties relevant for the LBS;
- zone data bay be signed and shared (e.g., published or made available for querying);
- the location of equipment that is subject to LBS may be determined;
- location data may be signed and shared;
- the LBS may be notified of, or query, location data and zone data for hosted equipment;
- the LBS may authenticate location data and zone data; and
- the LBS may reconfigure equipment according to policy.

To comply with regulations or safety needs, a component may always remain in the most conservative configuration unless it receives explicit clearance by authentic zone data.

In a further particularly advantageous embodiment, at least one in the ruleset stipulates:

- restrictions of entry to the predetermined zone by at least one device; and/or
- restrictions of radio frequency power transmitted to, from or via the predetermined zone by at least one device.

In particular, for devices whose operation may pose a hazard, such as drones, certain zones in the industrial plant may be designated as no-fly zones. Operations of vehicles may be confined to areas in which they are technically fit to operate. For example, vehicles that are not meant to come into contact with saltwater may be restricted from entering areas close to saltwater. Also, only four-wheel drive vehicles that are meant to be operated underground may enter underground areas of a mining plant.

Restrictions of radio frequency power may, in particular, serve to avoid creating sources of ignition in an area with a potentially explosive atmosphere. For example, as a worst case, it may be assumed that some conductive object in the area may heat up or create a spark if irradiated with radio frequency power of a matching frequency and a sufficient amount of power. It may then be stipulated that radio frequency power may be present in the area only to the extent that this cannot create a source of ignition even under the most favorable conditions for the creation of heat, and/or a spark.

In future automation systems, engineering and operation tools, localization systems, mobile and stationary equipment, i.e. all automation-related assets and functions will be part of a common communication and security context. We leverage this to remove tight coupling of components that today leads to island solutions, double work, and data intransparency. We get an open plug-and-play system without compromising on security.

Zone management includes definition of (no)fly zones for drones, roads, space occupied by mobile equipment, walkable areas, Ex0/1/2 zones, etc. together with properties like speed limits, energy limits, traffic priorities, etc.

This is done independent from services for/within drones, AGVs, instruments, actuators, IO devices, mobile workforce, etc. that adjust their behavior depending on the properties of the zone in which they are (or refrain from entering in the first place).

Integration may be achieved by tagging zone data, cryptographically signing them, and making them generally available within the system.

This may be done using a common dictionary for zone properties, a common root of trust to sign the data, and a common communication infrastructure to publish/query the data.

In a particularly advantageous embodiment, multiple actions to be performed by multiple to-be-controlled devices are determined by a central control entity. In this manner, the available space in the industrial plant, as well as the available moving speeds of the to-be-controlled devices, may be utilized to a better degree. Ideally, all devices perform their motion at the speed which is best for the efficiency of the industrial plant without being encumbered by the requirement of collision avoidance, this collision avoidance being reliably provided by the central control entity.

In a further particularly advantageous embodiment, the at least one to-be-controlled device applies a ruleset of its own at least to:

- filter to-be-performed actions received from the central control entity; and/or
- determine a to-be-performed action in case communication with the central control entity is not available.

The filtering of to-be performed actions introduces another layer of safety. For example, if the central control entity commands the performing of a certain action, but the to-be-controlled device is not in the position to perform this action for any reason, the performing of this action may be suppressed. For example, a vehicle may not move automatically as commanded by the central control entity if it is determined by on-board sensors that some obstacle is in the way, or that a door or hatch has been left open.

The independent determining of a to-be-performed action is a backup that ensures at least some functionality of the vehicle in case communication with the central control entity becomes unavailable. For example, in an underground area of a mining plant, communication with the central control entity may not always be reliable.

In a further advantageous embodiment, the central control entity performs a consistency check between actions to be performed by different to-be-controlled devices. In this manner, contradictions in the ruleset, e.g., of the kind that two rules cannot be complied with at the same tie, may be spotted.

In a further particularly advantageous embodiment, at least one device in the industrial plant publishes at least its location, and/or the to-be-controlled device obtains at least one location of another device, according to a publish-subscribe model. In this manner, this information is available to all other devices, but it will only be processed by those devices for which it is relevant. That is, in an industrial plant with many devices, the devices will not be overwhelmed by a flood of messages of which only a tiny portion is relevant. Meaningful publication topics include but are not limited to zone names, device type (including both mobile equipment and people), and it is advantageous to publish/subscribe topics using a spatial or taxonomical hierarchy to allow subscribers to choose a suitable granularity, e.g. mine1.pit1.area.1 or mobileentity.worker.externalcontractor.

In a further advantageous embodiment, a central entity acquires locations of devices and notifies the to-be-controlled device about the identities of devices entering or leaving its vicinity according to a correspondingly defined rule. In this manner, the central entity can act as a broker that provides, to each to-be-controlled device, information about relevant other devices. Which other devices are relevant may, for example, depend on the identities, types and/or locations of these other devices. The notifying facilitates the subscribing of the to-be-controlled device to the position/zone data of other devices within a defined vicinity of the to-be-controlled device.

In a further particularly advantageous embodiment, the to-be-controlled device discovers other devices in its vicinity by evaluating radio transmissions broadcasted by these other devices, and/or responses to a radio interrogation transmitted by the to-be-controlled device. In this manner, the discovery of other devices can be physically constrained to a certain vicinity of the to-be-controlled device. That is, not all devices in the industrial plant respond at once and flood the to-be-controlled device with messages.

As discussed before, the method may be at least partially computer-implemented. The invention therefore also relates to one or more computer programs with machine-readable instructions that, when executed on one or more computers and/or compute instances, cause the one or more computers to perform the method described above. In this context, a virtualization platform, a hardware controller, network infrastructure devices (such as switches, bridges, routers or wireless access points), as well as end devices in the network (such as sensors, actuators or other industrial field devices) that are able to execute machine readable instructions are to be regarded as computers as well.

The invention therefore also relates to a non-transitory storage medium, and/or to a download product, with the one or more computer programs. A download product is a product that may be sold in an online shop for immediate fulfillment by download. The invention also provides one or more computers and/or compute instances with the one or more computer programs, and/or with the one or more non-transitory machine-readable storage media and/or download products.

The method may optionally be upgraded with the following variants:

- Use of RFC 7946 to represent zone data or a corresponding OPC UA information model.
- Zones for equipment or persons are further qualified by the plant area (possibly also implemented as a zone). By correlating an equipment or person zone to an area of the site, e.g. data publication and subscription can be optimized, publishing/subscribing on channels or topics for that area to prevent equipment having to evaluate all zone data.
- In addition to qualitative semantic annotations (“road”, “walkable area”, etc.), also semantically tagged quantitative properties (“speed limit”, etc.) are added to a zone definition and dynamically updated (“current speed”, etc.).
- Building a directory of equipment and services participating in the exchange of zone data e.g. by subscribing to the exchanged zone data.
- Building a directory of equipment to be controlled, including data from engineering or equipment management tools.
- Zone and location data are timestamped.
- During plant engineering, Ex-zones, walkable areas, roads, etc. are defined and exported/extracted from the CAD engineering tool. E.g. Aucotec’s Engineering Base (EBASE) supports the handling of Ex-zones, and this data could be exported and exposed via a secure edge as a live zone-model. From a single, trustworthy source, we can supply information for sensor configuration, mobile device tracking (warning or shutting down managed devices if they approach or enter a hazardous zone).
- Re-use of automatically generated zones from scanning environment to create a work item set for zones to be annotated. E.g. this could be useful for changing environments like mines. An auto-generated zone could receive strict default-annotations (e.g. Ex0 by default) that an engineer must reduce if possible.
- Re-use of security context established for OPC UA, e.g. using OPC 10000-21, or using an Industry 4.0 asset administration shell.
- Zone and location data are encrypted (e.g. AEAD using AES) to ensure confidentiality.
- Equipment can self-localize using GPS, IP addresses[2], RFID tags, WiFi SSIDs and signal strengths, cell IDs, etc. or use an external localization service. This can be complemented with a trusted location stamp.
- Integrating devices scanning passive (non-communicating) objects or obstacles like ore piles using laser, LIDAR, etc. scanners, publishing this information on behalf of the passive object. These scanners can be mounted to other mobile equipment. We can track the age of scanning data, indicating how current or potentially outdated a zone scan is, also deriving scanning work orders.
- The application function offering the LBS can be hosted on the equipment, within engineering tools, or as a separate component attached to the communication infrastructure. E.g. a device can self-parameterize to fit local regulations. E.g. an engineering tool can determine for stationary equipment in which zone they are and trigger corresponding configuration top-down. E.g. a cellular system can track mobile devices and adjust communication properties without the devices needing any dedicated support for this.
- Privacy of human location data: discuss pseudonymization of such data when reporting location stamps back to the system.
- Equipment can request publication of data for its interests and area.
- Keep-alive messages for zoning data with timestamp and version without retransmitting all zone data continuously. Generally, the transmission frequency or conditions can be configured on an equipment or service depending on the needs of the application.
- Provide an auditable history of changes of the zone data.
- As part of discovery and system integration, connected components (e.g. equipment, mobile devices, AGVs, UAVs) bear a profile, stating if they are mobile or have parameters that are constrained by mounting location.
- In a further variant, the components expose which zoning information is relevant for them, i.e. what is valuable to defined and expose (e.g. Ex-zones) when using them, and they state their properties that relate to the zoning applications (e.g. max. emitted energy, Ex-certificates, representation of a human life, top speed, etc.).
- Tracking of mobile entities, where the system using e.g. video surveillance, radio monitoring, presence detection, etc. determines moving objects or moving/present people and correlates them to registered components. If entities are detected that have no registered profile (e.g. a supplier service truck), the system can issue warnings or alarms when movement into a potentially hazardous way is detected (e.g. a strange person moving into an Ex-zone, entering a mine; a truck driving off a regular road, etc.).

Assigning temporary trackers to external parties visiting the site to attach to clothing, vehicles, etc. as part of the site admission process (which typically includes security checks, briefings, handing out badges, etc. already).
  - Pre-configured as general mobile entity indicating a person or vehicle with worst-case dimensions and a low precision of these dimensions but no further qualification.
  - Preferably configuring the particular size or speed of the vehicle for parties with regular visits or contracts.
  - Onboarding external mobile devices e.g. through a provided tracker app to participate in the outline methods and also allow itself to consume and process data from other equipment.
  - Configuring such an app to only reveal need-to-know zones for equipment not owned or operated by them to the external user.

Equipment self-configures to comply with country-specific regulations.

Use of a vendor, plant, project, customer specific semantic dictionary, e.g. when no standardized dictionary like IEC 61987 contains the needed semantic identifiers.

Mobile devices make their locations transparent for use by other applications unknown to them.

Device zones/geofences to limit communication energy:
  - Limit communication energy on wired communication (reducing SNR and effective cable length or for a given cable the throughput.
  - Limit communication energy on wireless communication, in particular with technologies using beamforming as e.g. specified in WiFi or 5G.
  - Considering in addition to the locations of the communication equipment also the zones where the radio is passing through.

Define mobile zones/geofences for mobile equipment itself:
  - Mobile equipment maintains a zone definition for the space it currently occupies (using one of the secure localization functions of built-in localization) and publishes this information itself.
  - Mobile equipment subscribes to zone data from other mobile equipment.
  - Mobile equipment publishes their intended movement path with expected timestamps and a time precision.
  - Mobile equipment zones are also given a priority, allowing e.g. cars to have the right of way over unmanned equipment, causing the unmanned equipment to self-stop if they expect a collision.
  - Collision (avoidance) scenarios: machine with another machine, machine with person, machine with physical obstacle, machine with material (pile, ship, etc.), machine with mobile vehicles.
  - Mobile equipment is configured to update its zone data when a configurable distance has been moved or time has passed (ensure updates even when not moving).
  - The age of zone data is used to control speed or cause even stop in an area (old but distant is not necessarily an issue, depending on a vehicle's top speed). As one approach, the speculative zone that an equipment could occupy after its last data transmission is calculated based on the last zone data and the last/maximum/typical speed, i.e. we calculate the reachable area. Another option is to create speed profiles per equipment type that are applied using the oldest timestamp of zone data in the vicinity (an absolute distance or e.g. calculated as described in the previous point).

Define and apply different configuration sets to the controlled equipment depending on the distance to other relevant zones, both static or moving, considering the speed of moving zones. E.g. a truck driving toward a person should reduce speed before collision occurs; it can gradually do so as a function of distance and speed component in the direction of the person.

Identify zones that intersect with a line of sight between pairs of equipment zones e.g. to
  - restrict wireless transmission/beamforming power through hazardous areas in between communicating equipment;
  - connect through a different radio path;
  - calculate reliability or throughput or other KPIs of reducing power as opposed to choosing another (longer, obstructed, etc.) communication path to automatically decide for configuration yielding the best communication according to the defined KPIs.

Define temporary zones
  - statically, e.g. from 9 am to 5 pm on weekdays, and/or
  - dynamically, e.g. blasting zone in a mine.

Build software-defined safety zones by defining safety-relevant properties of zones.
  - Zone management then includes change management features to ensure certification-relevant changes only happen in a controlled manner with a corresponding approval process.
  - This includes handling the dynamic zone occupied by mobile equipment, which can be considered with increased trust if it is the result of automated and authenticated equipment tracking data.
  - Tracking information is communicated with a precision level over a safe communication channel; if the (certified) tracking system or the communication fail or decreases in precision, this causes the mobile equipment to go to a safe(r) state (e.g. reducing speed and using only more reliable but less performant built-in collision detection).

Provide a prediction of future zones or zone properties like for mobile equipment, planned blasting, etc. to allow applications to enable a preemptive zones/geofencing:
  - Include likelihood/precision for a given zone, individual parts of a zone or gradients, and properties.
  - E.g. for rail-mounted equipment, movement is evidently much restricted when it moves.
  - This includes tapping into work order management, e.g. predicting where a manned vehicle will probably drive, further considering points of interest along the way.

Zone/geofence consistency checking across management systems:
  - Verify quality of zoning data and related policy compliance (e.g. is the entire plant zoned by Ex-level? Is spatial coverage data available from all mobile equipment?). Is zone data not older than a certain threshold (using timestamps, see above), which can be made dependent on equipment type or person and e.g. their current speed, trajectory, or planned movement.

Generally, applications may consider not only the space, the properties, but also the age of zone data.

In addition to a centralized consistency checking, also each equipment or person (mobile device) can check the needed consistency. If the equipment/app stops getting updates about other zones of previously moving entities, it can decide to also become cautious and move slower or indicate to the person to move slower.

Verify applications/LBS coverage, registering applications and the properties/tags they interpret with the system so at any time it is possible to determine if zones are tagged for the needs of all running LBS.

Checking the cross-consistency of zone data with other tracking and surveillance mechanisms. E.g., check zone data against video surveillance:

Positive check: do we see everything where it claims to be or move?

Negative check: is something moving where we have no zone data?

Monitoring if movement is detected when expected e.g. based on shift plans or work orders, preventing workers forget mobile devices or are not wearing needed trackers, etc. or vehicles are parking/not detected when they should be moving (outside of repairs, etc.).

The geofencing application/LBS does not need to bring its own zone management or localization functions. Today, these are typically tightly coupled. Innovations include:

Use of semantic dictionary;

Built-in security (encryption and authentication methods, e.g. AEAD using AES, signatures using RSA or ECC);

Extension of geofencing to stationary equipment.

This provides industry-grade geofencing for open and modular automation systems:

Open, loose coupling of zone management and applications;

Easy to manage, only providing zones with behavioral intent;

Safe and secure, equipment is in safe and secure state by design.

Further innovations include mobile zones (moving with the device), preemptive zoning (using predicted zones to anticipate and prevent potentially problematic system states), and global consistency checking on zone data (e.g. moving devices cannot simply disappear or "tunnel" to a remote location, etc.) as network-based connected services (considering network location instead or addition to spatial location). By making zone and location data transparently available throughout the system, other zoned/geofencing applications can make use of all this data without the providing application having to know any details about this.

Software-defined safety zones also enable new approaches for mobile equipment safety (note that today, this will rather complement the basic safety certification process). This is not intended at this point in time to replace safety certification processes or the built-in safety functions of (mobile) equipment, but to complement these functions for higher productivity and flexibility of the production process.

FIG. 1 is a schematic flow chart of an embodiment of the method 100 for operating a plurality of devices 21-25 in an industrial plant 1.

In step 105, a mutual cryptographic trust relationship 6 is established among the devices 21-25, and between these devices 21-25 and an entity 5 that is used to cause a to-be-controlled device to perform at least one action 4. In the example shown in FIG. 1, the to-be-controlled device is the device 21. But in the course of the method, multiple of the devices 21-25 may be controlled to perform actions 4, one after the other or simultaneously. According to block 105*a*, the mutual cryptographic trust relationship 6 is established by onboarding the devices 21-25 and the entity 5 onto a common public-key infrastructure, PKI.

In step 110, at least the location 21*a* of a to-be-controlled device 21 within the industrial plant 1 is obtained.

In step 120, at least the locations 22*a*-25*a* of other devices 22-25 in the vicinity of the to-be-controlled device 21 are obtained.

In step 130, based at least in part on a ruleset 3 with rules that are dependent at least on the locations 22*a*-25*a* of the other devices 22-25, at least one action 4 that may be performed by the to-be-controlled device 21 is determined.

In step 140, the to-be-controlled device 21 is caused to perform the action 4.

According to block 111, a space 21*b* occupied by the to-be-controlled device 21 may additionally be obtained. According to block 121, spaces 22*b*-25*b* occupied by the other devices 22-25 in the vicinity of the to-be-controlled device 21 may then be obtained as well. According to block 131, at least one rule of the ruleset 3 may then stipulate that the space 21*b* occupied by the to-be-controlled device 21 must not intersect a space 22*b*-25*b* occupied by another device 22-25 in the vicinity of the to-be-controlled device 21.

According to block 112, a predicted and/or planned future location 21*a*' of the to-be-controlled device 21, respectively a predicted and/or planned future space 21*b*' occupied by the to-be-controlled device 21, may additionally be obtained. According to block 122, a predicted and/or planned future location 22*a*'-25*a*' of at least one other device 22-25 in the vicinity of the to-be-controlled device 21, respectively a predicted and/or planned future space 22*b*'-25*b*' occupied by this other device 22-25, may then be obtained as well. Predicted future spaces 21*b*'-25*b*' may then be used additionally to evaluate rules in the ruleset 3.

According to block 132, the ruleset 3 may comprise at least one rule that is dependent on whether the location 21*a* of the to-be-controlled device 21 is within a predetermined zone 11 in the industrial plant 1.

According to block 133, at least one rule in the ruleset 3 may stipulate restrictions of entry to the predetermined zone 11 by at least one device 21-25; and/or restrictions of radio frequency power transmitted to, from or via the predetermined zone 11 by at least one device 21-25.

According to block 134, multiple actions 4 to be performed by multiple to-be-controlled devices may be determined by a central control entity 5. According to block 134*a*, the central control entity may perform a consistency check between actions 4 to be performed by different to-be-controlled devices 21-25.

According to block 135, at least one to-be-controlled device 21 may apply a ruleset of its own at least to:

filter to-be-performed actions 4 received from the central control entity 5; and/or determine a to-be-performed action 4 in case communication with the central control entity 5 is not available.

Figure 2:
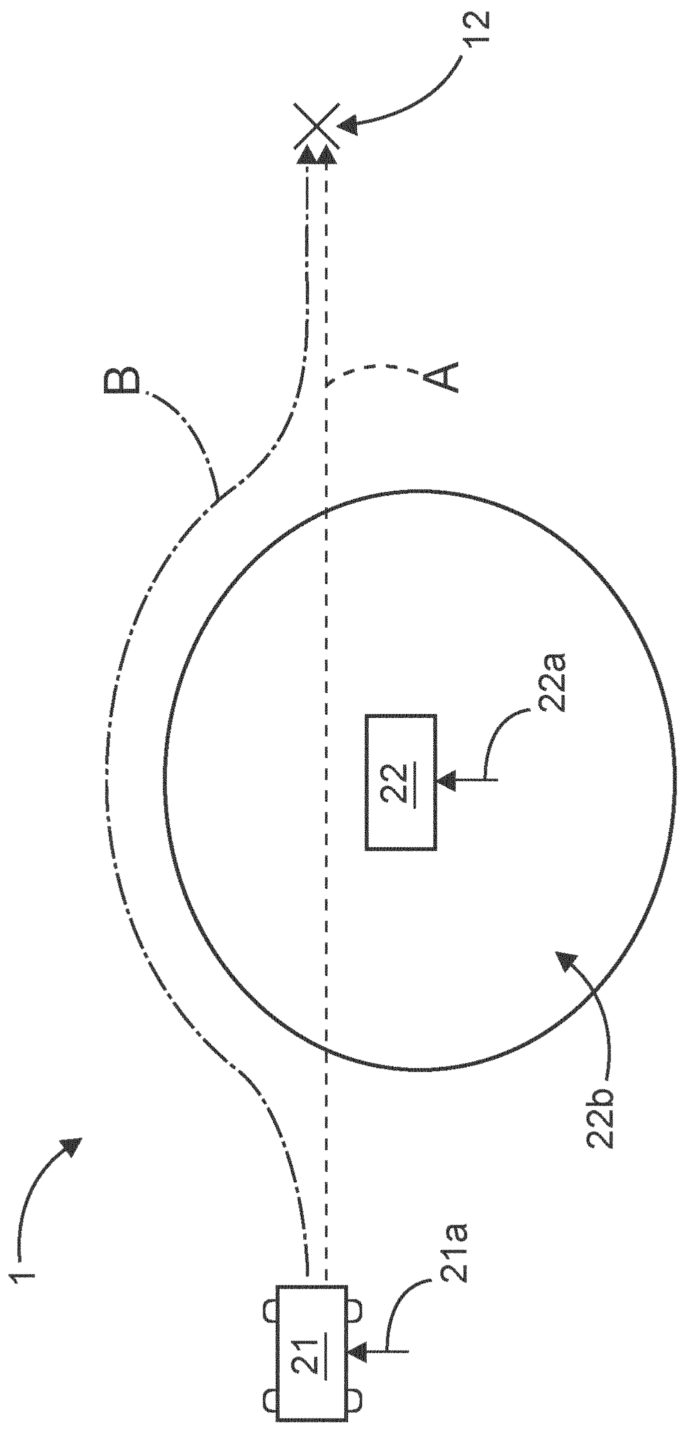
FIG. 2: Exemplary application of the method 100 for planning a route through an industrial plant 1.

FIG. 2 illustrates an exemplary application of the method 100 for planning a route through an industrial plant 1. In this simple example, the to-be-controlled device is a manned car 21 at location 21*a* that is to drive to a site 12 in the industrial plant 1. In the plant, an excavator as the second device 22 is currently at the location 22*a* and has a working area 22*b* where it is currently working. The direct path A to site 12 would lead through this working area 22*b*. To avoid any conflict with the excavator 22, the manned car 21 is therefore routed around the working area 22 on path B.

Figure 3:
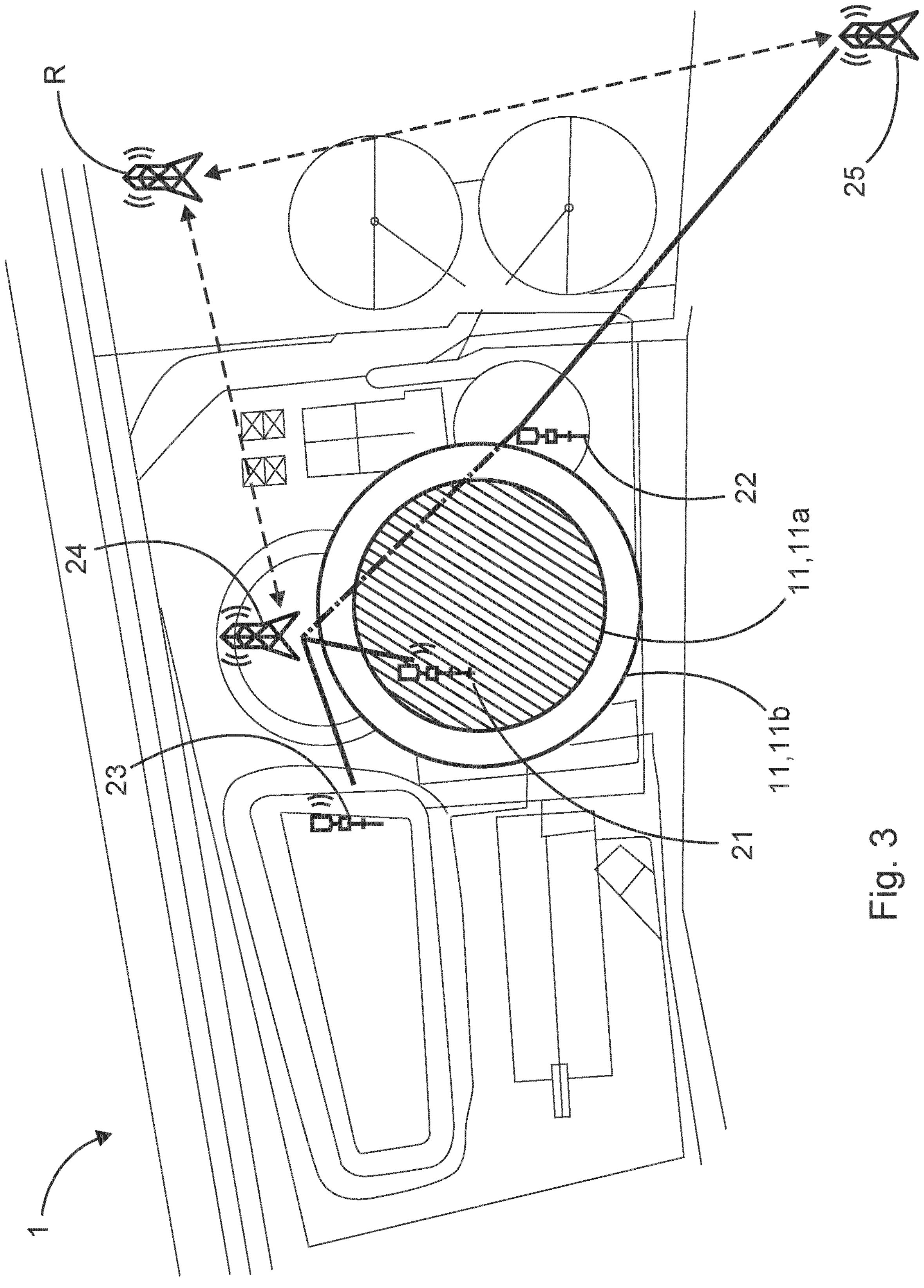
FIG. 3: Exemplary application of the method 100 for regulating the power of radio transmissions in an industrial plant 1.

FIG. 3 illustrates an exemplary application of the method 100 for regulating the power of radio transmissions in an industrial plant 1. In this example, the industrial plant 1 comprises a first zone 11, 11*a* where a potentially explosive atmosphere is always present, and a second zone 11, 11*b* where a potentially explosive atmosphere is only present intermittently. The to-be-controlled devices 21-25 comprise three transmitting stations 21-23 and two base stations 24, 25 in a wireless communication network. Within the zone 11, 11*a*, power density of radio communications is curtailed, so that the radio frequency energy can never be converted to sufficient heat or even a spark that may serve as an ignition source.

This means that only transmitter 23 and base station 24 can communicate with each other without any restriction as to transmit power. For communications to and from transmitter 21, power density produced during beamforming must be limited because transmitter 21 is in the first zone 11, 11*a*. But also communication between base stations 24 and 25 has to be limited in power density because the beam passes through the first zone 11, 11*a*. A possible alternative is to route traffic between base stations 24 and 25 via a relay station R on paths that stay clear of zones 11, 11*a*, 11*b*.

LIST OF REFERENCE SIGNS

1 industrial plant
11 zone in industrial plant
11*a-b* zones with different explosion hazards
12 site in industrial plant 1
21-25 devices in industrial plant 1
21*a*-25*a* locations of devices 21-25
21*a*'-25*a*' predicted and/or planned future locations 21*a*-25*a*
21*b*-25*b* spaces occupied by devices 21-25
21*b*'-25*b*' predicted and/or planned future occupied spaces 21*b*-25*b*
3 ruleset
3' auxiliary ruleset generated by device 21-25
4 to-be-performed action
5 central control entity
6 mutual cryptographic trust relationship
100 method for operating devices 21-25
105 establishing mutual cryptographic trust relationship 6
105*a* onboarding onto PKI
110 obtaining location 21*a* of to-be-controlled device 21
111 obtaining space 21*b* occupied by device 21
112 obtaining future location 21*a*', and/or space 21*b*'
120 obtaining locations 22*a*-25*a* of other devices 22-25
121 obtaining spaces 22*b*-25*b* occupied by devices 22-25
122 obtaining future locations 21*a*'-25*a*', and/or spaces 21*b*'-25*b*'
130 determining to-be-performed action 4
131 stipulating non-intersection of spaces 21*b*, 22*b*-25*b*
132 making rule dependent on location 21*a* in zone 11
133 specific restrictions for zone 11
134 determining multiple actions 4 by central control entity 5
134*a* performing consistency check by central control entity 5
140 causing to-be-controlled device 21 to perform action 4
A, B routes in industrial plant 1
R relay base station in industrial plant 1

The invention claimed is:

1. A computer-implemented method for operating a plurality of devices in an industrial plant, comprising:
obtaining at least a location of a to-be-controlled device within the industrial plant;
obtaining locations of other devices in a vicinity of the to-be-controlled device;
determining, based at least in part on a ruleset with rules that are dependent at least on the locations of the other devices, at least one action that may be performed by the to-be-controlled device; and
causing the to-be-controlled device to perform the at least one action,
wherein at least one of the other devices in the industrial plant publishes at least its location, and/or the to-be-controlled device obtains at least one location of another device, according to a publish-subscribe model,
wherein a central entity acquires locations of devices and notifies the to-be-controlled device about identities of devices entering or leaving its vicinity according to a correspondingly defined rule.

2. The computer-implemented method of claim 1,
wherein the ruleset further comprises at least one rule that is dependent on whether the location of the to-be-controlled device is within a predetermined zone in the industrial plant, and wherein the predetermined zone is defined independently from the ruleset and referenced directly or by type/class of zone from at least one rule in the ruleset.

3. The method of claim 2, wherein at least one rule in the ruleset stipulates restrictions of entry to the predetermined zone, and/or restrictions of radio frequency power transmitted to, from or via the predetermined zone, by at least one device.

4. A computer-implemented method for operating a plurality of devices in an industrial plant, comprising:
obtaining at least a location of a to-be-controlled device within the industrial plant;
obtaining locations of other devices in a vicinity of the to-be-controlled device;
determining, based at least in part on a ruleset with rules that are dependent at least on the locations of the other devices, at least one action that may be performed by the to-be-controlled device; and
causing the to-be-controlled device to perform the at least one action,
wherein multiple actions to be performed by multiple to-be-controlled devices are determined by a central control entity, and at least one to-be-controlled device applies an additional ruleset at least to:
filter to-be-performed actions received from the central control entity; and/or
determine a to-be-performed action when communication with the central control entity is unavailable.

5. The method of claim 4, further comprising performing, by the central control entity, a consistency check between actions to be performed by different to-be-controlled devices.

6. The method of claim 2, further comprising establishing a mutual cryptographic trust relationship among the plurality of devices in the industrial plant, and between the plurality of devices and an entity that causes the to-be-controlled device to perform the at least one action.

7. The method of claim 6, wherein the establishing of the mutual cryptographic trust relationship comprises onboarding the plurality of devices and the entity onto a common public-key infrastructure.

8. The method of claim 2, further comprising:

obtaining a space occupied by the to-be-controlled device; and obtaining spaces occupied by the other devices in the vicinity of the to-be-controlled device;

wherein at least one rule of the ruleset stipulates that the space occupied by the to-be-controlled device must not intersect a space occupied by any of the other devices in the vicinity of the to-be-controlled device.

9. The method of claim 2, further comprising:

obtaining a predicted and/or planned future location of the to-be-controlled device, or a predicted and/or planned future space to be occupied by the to-be-controlled device; and obtaining a predicted and/or planned future location of at least one of the other devices in the vicinity of the to-be-controlled device, or a predicted and/or planned future space to be occupied by the at least one of the other devices in the vicinity of the to-be-controlled device.

10. The method of claim 8, wherein the to-be-controlled device and at least one of the other devices in the vicinity of the to-be-controlled device are work vehicles configured for operating in a mining plant or on a construction site.

11. The method of claim 2, wherein the to-be-controlled device is configured to discover the other devices in its vicinity by evaluating radio transmissions broadcasted by the other devices, and/or responses to a radio interrogation transmitted by the to-be-controlled device.

12. A non-transitory computer storage medium containing executable instructions that, when executed by a processor, cause the processor to execute a computer-implemented method for operating a plurality of devices in an industrial plant, the computer-implemented method comprising:

obtaining at least a location of a to-be-controlled device within the industrial plant;

obtaining locations of other devices in a vicinity of the to-be-controlled device;

determining, based at least in part on a ruleset with rules that are dependent at least on the locations of the other devices, at least one action that may be performed by the to-be-controlled device; and causing the to-be-controlled device to perform the at least one action, wherein at least one of the other devices in the industrial plant publishes at least its location, and/or the to-be-controlled device obtains at least one location of another device, according to a publish-subscribe model, wherein a central entity acquires locations of devices and notifies the to-be-controlled device about identities of devices entering or leaving its vicinity according to a correspondingly defined rule.

* * * * *